United States Patent [19]

Doty

[11] Patent Number: 4,736,902

[45] Date of Patent: Apr. 12, 1988

[54] LOCKING SAFETY BELT RETRACTOR

[75] Inventor: Gerald A. Doty, Crown Point, Ind.

[73] Assignee: Gateway Industries, Inc., Olympia Fields, Ill.

[21] Appl. No.: 883,037

[22] Filed: Jul. 8, 1986

[51] Int. Cl.[4] .................... B60R 22/40; B65H 75/48
[52] U.S. Cl. ............................................. 242/107.4 A
[58] Field of Search ................. 242/107.4 A, 107.4 C; 297/478; 280/806

[56] References Cited

U.S. PATENT DOCUMENTS

| 3,905,562 | 9/1975 | Kell | 242/107.4 A |
| 4,470,557 | 9/1984 | Ernst | 242/107.4 C |
| 4,475,697 | 10/1984 | Wyder | 242/107.4 A |
| 4,632,331 | 12/1986 | Bracnik | 242/107.4 A |

*Primary Examiner*—Stuart S. Levy
*Assistant Examiner*—Katherine A. Matecki
*Attorney, Agent, or Firm*—Fitch, Even, Tabin & Flannery

[57] ABSTRACT

A locking safety belt retractor includes an actuating mechanism which employs tension on the safety belt to shift a locking pawl into locking position in response to rapid deceleration of a vehicle accompanied by protraction of the safety belt. A clutch prevents overloading of the actuating mechanism.

4 Claims, 3 Drawing Sheets

LOCKING SAFETY BELT RETRACTOR

BACKGROUND OF THE INVENTION

The invention relates generally to safety belt retractors, and more particularly to a locking retractor.

A typical safety belt retractor includes a rotatable reel on which a safety belt is wound and a spring for urging rotation of the reel in a predetermined direction. The spring permits the reel to rotate so that the belt may be protracted for use, and retracts the belt after use. In a locking retractor, a locking mechanism prevents unwinding of the belt during rapid acceleration or deceleration of the vehicle, as due to a collision.

In one known type of locking mechanism, locking of the reel is effected by a first ratchet and pawl cooperating to bring a second ratchet and pawl into locking engagement. In response to rapid acceleration or deceleration, an inertial sensor displaces the first pawl into engagement with the first ratchet. The first ratchet is rotated by protraction of the belt, causing further displacement of the first pawl, which results in displacement of the second pawl into locking engagement with the second ratchet wheel, thereby preventing further rotation of the reel, as both ratchet wheels are typically fixed to a common shaft with the reel. In the above-described mechanism, the first ratchet and pawl are lightweight, as their function is merely to displace the second pawl. The second pawl and ratchet are heavier, as they are designed to withstand the stress resulting from the restraining function of the belt. If the second pawl engages the tip of one of the teeth on the second ratchet in such a manner that the second ratchet can continue to turn, but the second pawl is momentarily constrained, the first pawl and ratchet may be subjected to stress in excess of their strength, resulting in failure of one or both. In the past this problem has been addressed by attempting to maintain a timed relationship between the two ratchet wheels so that when the second pawl is displaced it does not engage the tip of a rachet tooth but rather enters between a pair of adjacent teeth.

The present invention provides a novel solution to the above problem which avoids any need to maintain a timed relationship between the respective ratchet wheels.

SUMMARY OF THE INVENTION

In accordance with the invention there is provided a locking safety belt retractor of the type employing an activating pawl and ratchet wheel and a locking pawl and ratchet wheel wherein the activating ratchet wheel is mounted on a common shaft with the locking ratchet wheel but is selectively rotatable relative thereto. The activating ratchet wheel is preferably rotatable relative to the shaft and locking ratchet wheel only when the torque on the activating ratchet wheel exceeds a predetermined maximum, and is connected to the shaft in such a manner that torque continues to be transmitted through the activating ratchet wheel while it rotates relative to the shaft. To this end, the activating ratchet wheel is preferably connected to the common shaft by a clutch which permits slippage under conditions of excessive torque. The clutch preferably comprises a coil spring disposed coaxially over the shaft so as to frictionally engage the shaft and having one end fixed to the activating ratchet wheel.

Accordingly, it is a general object of the invention to provide an improved locking retractor for a safety belt.

Further objects and advantages of the invention are set forth below.

DETAILED DESCRIPTION OF THE PREFERRED EMBODIMENT

Figure 1:
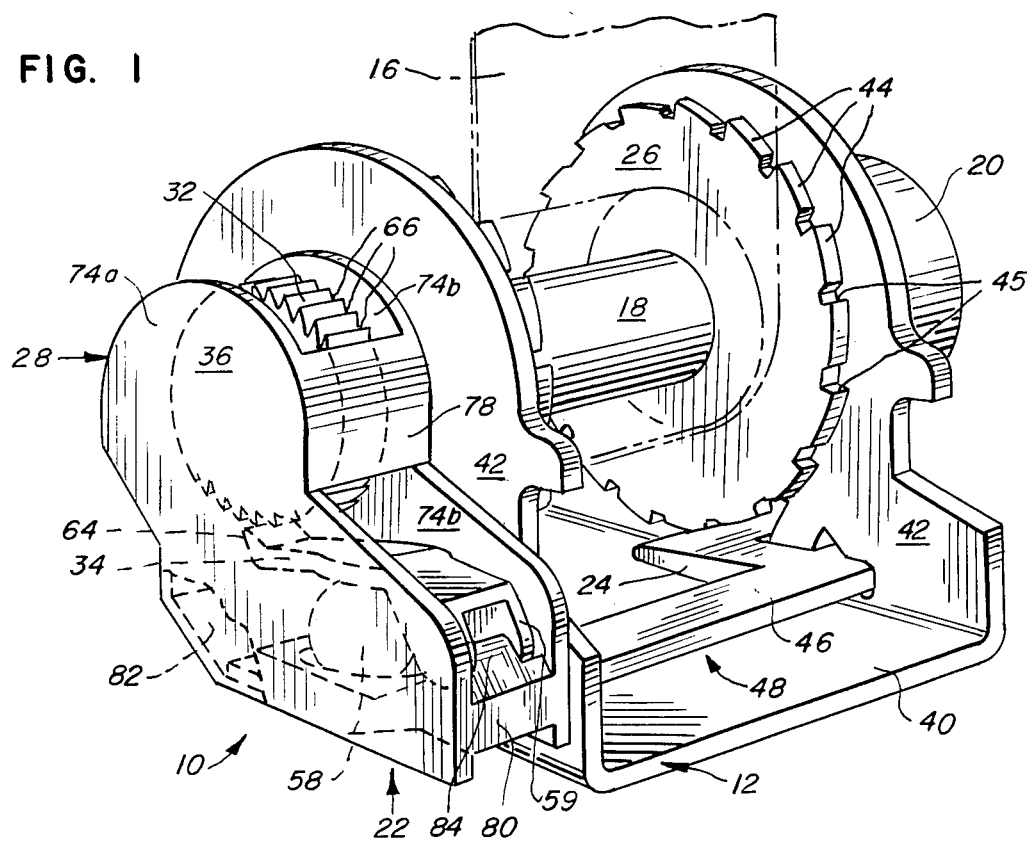
FIG. 1 is a perspective view of a retractor in accordance with the present invention.
Figure 2:
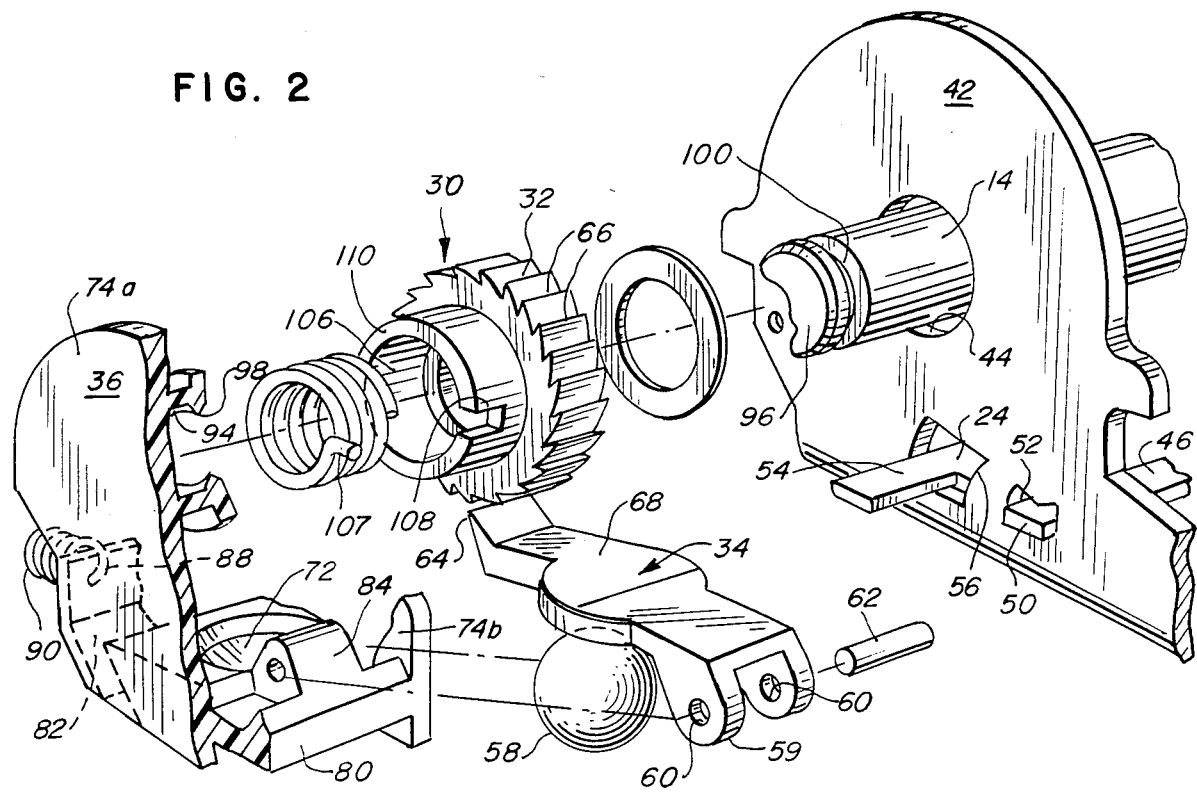
FIG. 2 is an exploded perspective view of a portion of the retractor of FIG. 1.

The invention is embodied in a locking safety belt retractor 10 for a motor vehicle. The retractor 10 includes a main frame 12 and a shaft 14 supported for rotation on the frame. The safety belt 16 is wound on a reel 18 disposed on the shaft 14.

Figure 3:
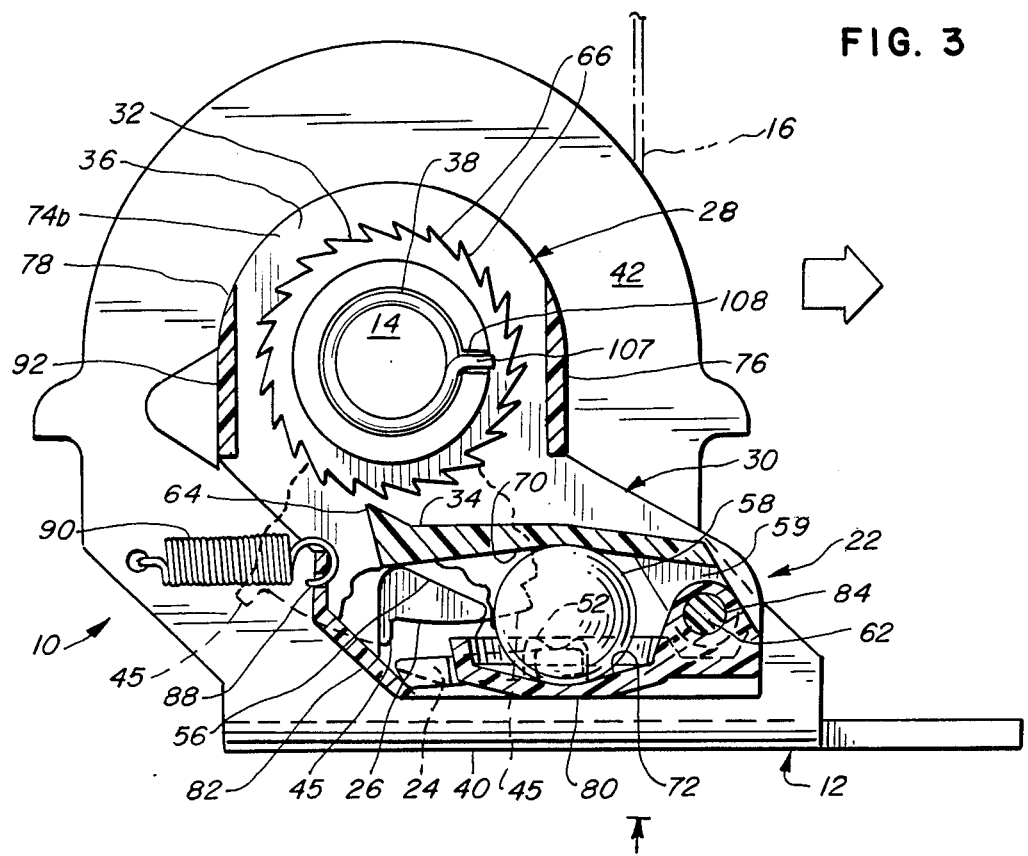
FIG. 3 is a sectional view of the retractor of FIG. 1.
Figure 4:
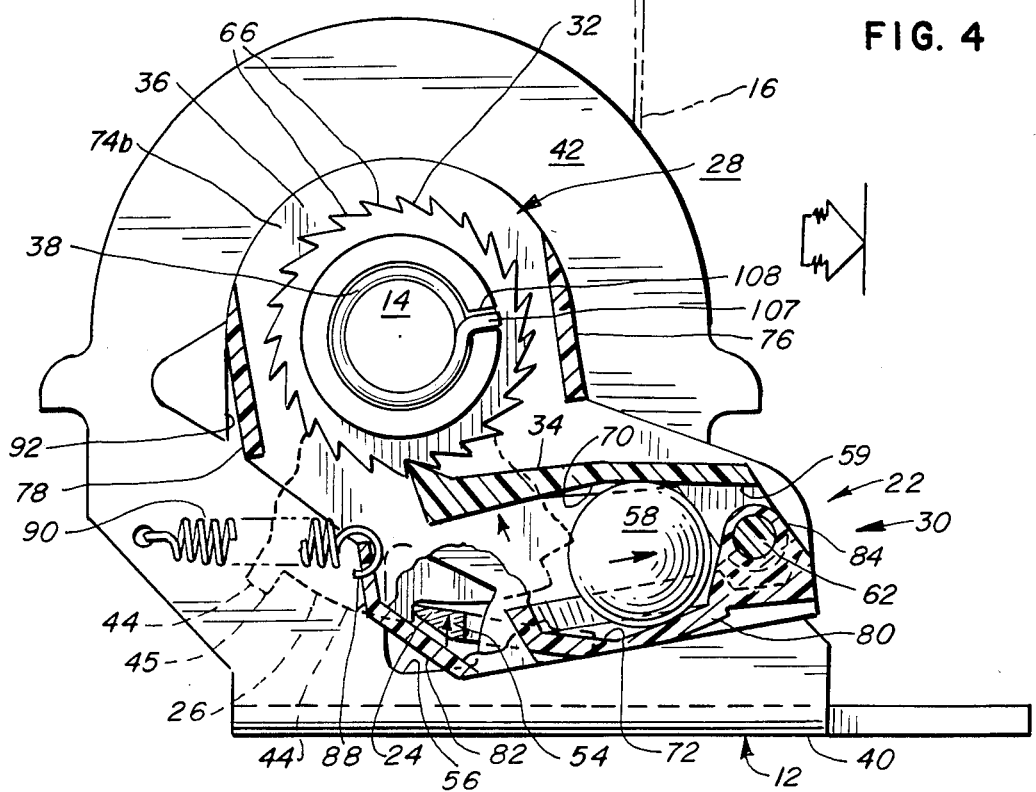
FIG. 4 is a sectional view of the retractor of FIG. 1, shown in locking position.
Figures 5, 6:
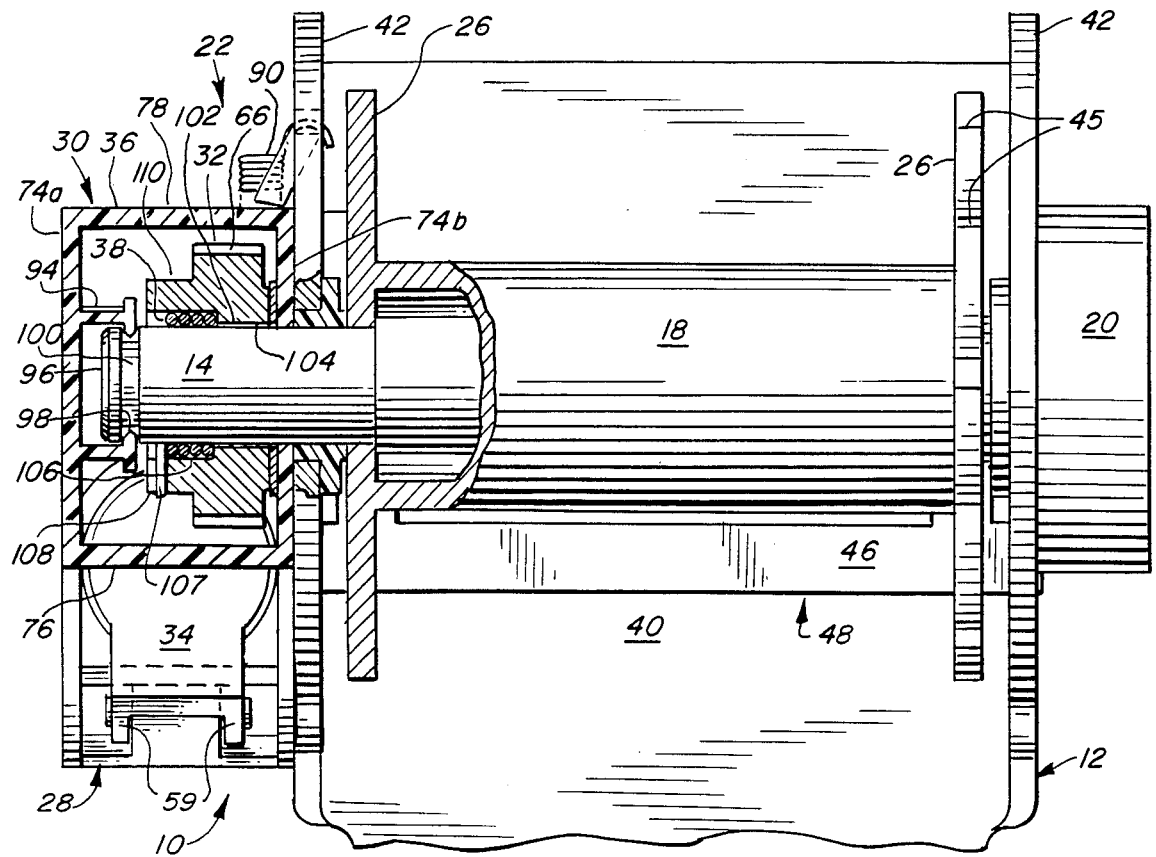
FIG. 5 is a plan view of the retractor of FIG. 1 shown with portions broken away.
FIG. 6 is a front elevational view of the retractor of FIG. 1, shown with portions broken away.

To provide for retraction of the belt, a spring assembly 20 biases the shaft 14 for rotation in a clockwise direction as viewed in FIGS. 3 and 4. To enable the safety belt 16 to restrain a vehicle occupant during occurrences such as rapid deceleration during a collision or overturning of the vehicle, the retractor 10 includes means 22 for sensing such occurrences and locking the reel 18 in response thereto to stop protraction of the belt.

Locking of the reel 18 is accomplished by causing a pair of locking pawls 24 to engage a pair of locking ratchet wheels 26, fixed to the shaft upon which the reel 18 is mounted. In the illustrated embodiment, the ratchet wheels 26 are disposed on each side of the reel 18 to aid in maintaining the belt 16 on the reel 18.

In response to an occurrence such as an accident causing rapid deceleration of the retractor 10 followed by protraction of the belt 16, an actuating mechanism 28 employs the belt tension to provide force to shift the locking pawls 24 into locking position. The actuating mechanism 28 selectively connects the reel 18 to the locking pawls through a connecting mechanism 30 which includes an activating ratchet wheel 32 mounted upon the shaft and an activating pawl 34 pivotally mounted on a movable frame 36 which selectively displaces the locking pawls 24. Under normal conditions, there is no connection between the rotation of the activating ratchet wheel 32 and movement of the locking pawls 24. However, when rapid deceleration occurs, the sensing means 22 displaces the activating pawl 34 into engagement with the activating ratchet wheel 32 which causes shaft 14 to move into engagement with the locking ratchet wheels 26.

A potential problem with actuating mechanisms of the type described above is that the elements of the connecting mechanism 30 may be subject to failure due to excessive loading. To prevent such failure, in accordance with the present invention, a clutch 38 selectively permits rotation of the activating ratchet wheel 32 relative to the shaft 14. The clutch 38 transmits torque from the shaft 14 to the activating ratchet wheel 32 up to a predetermined maximum. Once the torque transmitted from the shaft 14 to the activating ratchet wheel 32 reaches the maximum, the clutch 38 permits unlimited slippage between the shaft 14 and the activating ratchet wheel 32 while continuing to transmit torque from the shaft 14 to the activating ratchet wheel 32. The preferred clutch 38 comprises a coil spring which is fixed to the activating ratchet wheel 32 and selectively grips the shaft 14 as described below.

Turning to a more detailed description of the illustrated embodiment of the invention, the main frame 12 comprises a substantially horizontal bottom wall 40 and a pair of substantially vertical side walls 42 extending upward therefrom. The shaft 14 is supported by the side walls 42 and extends through aligned openings 44a in the side walls 42. The side walls 42 and bottom wall 40 are preferably integral with one another. When the retractor is mounted in a vehicle, a housing, not shown in the drawings, will cover the retractor 10 and other components described below.

The safety belt 16, shown in phantom in FIGS. 1, 3 and 4, is wound on the reel 18 so that protraction of the belt 16 results in rotation of the reel 18 in a counterclockwise direction as viewed in FIGS. 3 and 4. The belt is guided by a slot in the housing.

The locking ratchet wheels 26 are disposed on opposite sides of the reel 18 as noted above. Each is a generally circular metal disc having a plurality of teeth 44 about its periphery. The teeth 44 are preferably configured so that when the locking pawls 24 are in engagement therewith, counterclockwise rotation of the ratchet wheels 26 provides forces to the tips 45 of the pawls 24, maintaining the locking engagement, whereas clockwise rotation of the wheels 26 tends to release the locking pawls 24. Each of the locking ratchet wheels 26 is affixed to the shaft 14 and is substantially perpendicular to the axis of the shaft 14.

The locking pawls 24 are rigidly connected by a horizontal crossbar 46. In the preferred embodiment, the locking pawls 24 and crossbar 46 are parts of an integral metal plate 48 which extends between the side walls 42 and is pivotably supported thereby. The plate 48 pivots about an axis coincident with the crossbar 46, which has its ends 50 disposed in openings 52 in the side walls 42 to support the plate 48 for pivoting. Each of the openings 52 has an hourglass shape to constrain the flat ends 50 of the crossbar 46 against vertical displacement while permitting rotation thereof about a horizontal axis of the crossbar 46. Further constraint of the plate 48 is provided by the cooperation of a pair of ears 54 which extend laterally through arcuate slots 56 in the side walls 42. The ears 54 extend horizontally outward from the tips 45 of the respective locking pawls 24.

Sensing of occurrences such as rapid deceleration or overturning of the vehicle in which the retractor is installed is accomplished by the sensing means 22 which may take many forms such as a pendulum (not shown) or a "wobble weight" (not shown). The illustrated sensing means 22 is in the form of a spherical mass 58 such as a steel ball which is normally maintained in a position of mechanical equilibrium as shown in FIGS. 1 and 3. The arrow in FIG. 3 indicates the direction of forward travel of a vehicle on which the retractor is mounted.

As illustrated, the spherical mass 58 is constrained against downward movement by a concave surface on the movable frame 36. When the retractor experiences rapid deceleration, due for example to emergency braking or a collision, the mass 58 travels horizontally, and the concavity of the supporting surface 72 on the movable frame 36 raises the mass as it travels horizontally.

The underside of the activating pawl 34 engages the top of the spherical mass 58 so that the upward movement of the spherical mass 58 forces the activating pawl 34 upward into engagement with the activating ratchet wheel 32. The activating pawl 34, activating ratchet wheel 32 and movable frame 36 then provide a mechanical connection between the shaft 14 and the locking pawls 24 to translate rotation of the shaft 14 due to protraction of the belt 16 into upward pivoting of the locking pawls 24. At one end of the activating pawl 34 is provided a pair of mounting lugs 59 having aligned openings 60 therethrough for receiving a mounting pin 62 to enable pivotal connection of the activating pawl 34 to the movable frame 36. At its opposite end, the activating pawl 34 has a sharp tip 64 for insertion between adjacent teeth 66 of the activating ratchet wheel 32. Between the tip 64 and the lugs 59 is an enlarged, generally circular portion 68 providing a concave, downwardly-facing surface 70 for engaging the top of the spherical mass 58. The concave surface 70 aids in stabilizing the spherical mass 58 and increases the upward displacement of the activating pawl 34 due to horizontal movement of the spherical mass 58. The concave surface 70 on the activating pawl 34 is directly above the concave surface on the movable frame 36.

In the illustrated embodiment, the movable frame 36 is pivotally supported on one end of the shaft 14, outside of the adjacent side wall 42. The spring assembly 20 for biasing the shaft 14 is disposed on the outside surface of the opposite side wall 42 and is connected to the opposite end of the shaft 14.

Under normal circumstances, the movable frame 36 is in the position illustrated in FIG. 3. The movable frame is supported on the shaft 14 by a pair of vertical side walls 74a and 74b. The vertical side walls 74a and 74b are parallel to one another and rigidly connected to one another by forward and rear upper walls 76 and 78 and forward and rear lower walls 80 and 82. The forward lower wall 80 provides the upwardly facing recess 72 for the spherical mass 58, and has an upwardly extending lug 84 for holding the pin 62 on which the activating pawl 34 is pivoted.

To cam the locking pawls upward when the movable frame 36 is rotated counterclockwise with respect to the main frame 12, the lower rear wall 82 slopes downwardly and forwardly and engages the adjacent ear 54 on the locking pawl plate 48. To facilitate biasing of the movable frame 36 to the position shown in FIG. 3, the lower rear wall 82 has an opening 88 formed near its upper edge to receive the forward end of a coil spring 90 which is loaded in tension and has its rear end attached to the main frame.

The upper rear wall 78 abuts a stop 92 on the main frame when the movable frame 36 is in the position shown in FIG. 3. The engagement between the upper rear wall 78 and the stop 92 limits clockwise travel of the movable frame 36.

To facilitate installation of the movable frame 36 during assembly, means are provided to enable the movable frame to be snapped onto the adjacent end 96 of the shaft 14. To this end, a sleeve 94 extends inwardly from the outer side wall 74a to receive the end 96 of the shaft 14, and the sleeve 94 has a ring 98 extending inwardly about its circumference for engagement with an annular groove 100 near the adjacent end 96 of the shaft. The inwardly extending ring 98 has an inner diameter slightly smaller than the outer diameter of the shaft 14 adjacent the end 96, but the ring 98 has a tapered crosssection which cooperates with a chamfer on the end 96 of the shaft to facilitate insertion of the shaft end 96 into the sleeve 94. The groove 100 has transverse sides to maintain secure engagement with the ring after insertion.

The activating ratchet wheel 32 and coil spring 90 are disposed between the side walls 74a and 74b of the movable frame. The ratchet wheel 32 has a stepped bore 102 which includes a first portion 104 having an inner diameter that fits the outer diameter of the shaft 14, and a second portion 106 which has a larger inner diameter to accommodate the clutch spring 38 between the bore and the shaft. The first portion 104 fits the shaft 14 in such a manner as to permit relative rotation between the wheel 32 and the shaft 14 while maintaining the ratchet wheel 32 substantially coaxial with the shaft 14. The spring 38 fits the shaft 14 more tightly, preferably in an interference fit. To this end, the inner diameter of tne spring 38 is smaller than the shaft outer diameter. One end 107 of the spring 38 extends radially outward through a slot 108 in a collar 110 on the ratchet wheel 32. When the ratchet wheel 32 is constrained against counterclockwise rotation by the activating pawl 34 and the shaft 14 is rotated counterclockwise by protraction of the belt 16, the frictional force exerted on the interior of the spring 38 by the shaft enlarges the spring slightly, thus limiting frictional force between the spring 38 and the shaft 14 to a predetermined maximum. The inner diameter of the larger portion 106 of the bore 102 of the rachet wheel 32 is larger than the outer diameter of the spring 38 adjacent thereto to permit expansion of the spring.

From the foregoing it will be appreciated that the above-described clutch mechanism provides a connection between the shaft 14 and the activating ratchet wheel 32 which enables transmission of torque therebetween up to a predetermined maximum without any slippage. The clutch mechanism also limits the torque which can be transmitted to the ratchet wheel 32, thereby limiting loading on the connecting mechanism 30. In addition, the clutch mechanism permits unlimited rotation of the activating ratchet wheel 32 and the shaft 14 while providing transmission of torque therebetween. The spring clutch 38 can be installed easily, simply by slipping it onto the shaft, and avoids any need to maintain the activating ratchet wheel 32 and the locking ratchet wheels 26 in any particular position relative to one another to maintain a timed relationship. If, when the locking pawls 24 are shifted upward, they initially strike the tips of teeth 44 on the locking ratchet wheels 26, the locking ratchet wheels 26 simply continue to rotate and the actuating mechanism 28 maintains upward pressure on the locking pawls 24 until they lock between adjacent pairs of teeth 44 on the respective wheels 26.

While the illustrated activating pawl and activating ratchet wheel have a relatively wide appearance and construction relative to conventional activator pawls and ratchet wheels, it will be appreciated that the activator pawl and ratchet wheel may be much slimmer and thinner than that shown in these drawings. The present invention should also be helpful in eliminating the problem of breaking the activator pawl when the belt is fully wound belt on the retractor reel. For instance, when handling a retractor before it is installed in a vehicle, a person may tilt the retractor at angles which will cause the inertia weight to shift the activator pawl into the activator ratchet wheel and a subsequent pull on the belt may break the plastic teeth on the activator ratchet wheel or jam the activator pawl into activator ratchet wheel teeth because the metal locking pawls are restrained from moving to engage the metal ratchet wheels because the fully wound belt holds them out of engagement. Thus, in this situation, the plastic activator pawl and plastic ratchet wheels may not be protected against a large loading thereon by the metal ratchet wheels and metal locking bar. In the present invention, however, the slip clutch will slip before any breakage of the activator pawl or ratchet wheels occurs at this fully wound condition.

The invention is not limited to the embodiments described above or to any particular embodiments, but is defined by the following claims.

What is claimed is:

1. A safety belt retractor for a vehicle comprising:
a main frame;
a shaft rotatably supported on the main frame;
a reel fixedly supported on the shaft;
a length of belt wound on the reel;
a first toothed wheel fixedly mounted on the shaft;
locking means pivotally mounted on the main frame and movable between a locking position wherein the locking means engages the first toothed wheel to prevent rotation of the first toothed wheel as well as the reel, and a released position; and
actuating means for selectively shafting the locking means from released position to locking position in response to rapid deceleration of the retractor accompanied by tension on the belt;
the actuating means including impact detection means and connecting means selectively translating rotation of the shaft due to protraction of the belt into motion of the locking means from its released position to its locking position, the connecting means including clutch means to limit the amount of force which can be applied to the connecting means to a predetermined maximum,
a second toothed wheel rotatably mounted on the shaft and connected thereto by the clutch means;
a movable frame movable mounted on the main frame and engaging the locking means;
an activating pawl pivotally mountd on the movable frame and movable between a disengaged position wherein the second toothed wheel may rotate freely with respect thereto and an engaged position wherein the activating pawl engages the second toothed wheel so that rotation of the second toothed wheel causes movement of the actuating frame to cam the looking means into locking position;
the impact detection means being operative to shift the activating pawl from disengaged position to engaged position in response to rapid deceleration of the retractor so that, in the event of rapid deceleration accompanied by tension on the belt causing rotation of the wheel, the activating pawl is shifted from disengaged position to engaged position, which causes subsequent rotation of the second toothed wheel to move the actuating frame on which the activating pawl is mounted, which in turn shifts the locking means into locking position,
said clutch means comprising a coiled spring disposed in a friction fit on the shaft, the coiled spring having an end fixed to the second toothed wheel so that the shaft can apply torque to the second toothed wheel without being locked thereto.

2. Apparatus in accordance with claim 1 wherein the impact detection means comprises a substantially spherical mass which is constrained against movement vertically downward but which is capable of movement in other directions in response to rapid deceleration thereof and which engages the activating pawl in such a manner that movement of the mass shifts the activating pawl from disengaged position to engaged position.

3. In a seat belt retractor for a vehicle the combination comprising:
   a retractor having a rotatable reel and a belt wound on the reel for protraction and retraction from the reel,
   a lock bar and ratchet wheel means movable to a locking position for locking the reel against belt protraction,
   a movable support mounted on said retractor frame for movement from a predetermined normal position to an actuating position,
   an activator pawl and ratchet mechanism mounted on the movable support and having a ratchet wheel connected to the reel to rotate therewith and an activator pawl to engage the ratchet wheel,
   an inertia sensor means mounted on the movable support for sensing deceleration of the vehicle and retractor and for actuating the activator pawl to engage the ratchet wheel,
   said movable support being operated by said activator pawl and ratchet mechanism to actuate said lock bar and ratchet wheel means to said locking position,
   a slip clutch connecting said movable support to said reel and limiting the amount of force being applied to said activator pawl and ratchet means and to said lock bar and ratchet wheel mechanism to prevent damage thereto,
   said slip clutch slipping when said movable support is blocked from moving the lock bar to its locking position with said ratchet wheel means;
   and return spring means connected between said movable support and said frame to bias the movable support to return to its predetermined normal position whether or not said slip clutch has slipped.

4. A safety belt retractor for a vehicle comprising:
   a main frame having a generally horizontal bottom wall and a pair of upstanding side walls;
   a shaft rotatably supported on the side walls of the main frame;
   a reel supported on the shaft and fixed with respect thereto;
   a length of belt wound on the reel;
   a pair of locking ratchet wheels fixed to the shaft and to the reel;
   a pair of locking pawls movable between a locking position in which they engage the respective locking ratchet wheels to prevent rotation thereof and a released position; and
   actuating means for selectively shifting the locking means from released position to locking position in response to rapid deceleration of the retractor accompanied by tension on the belt, the actuating means comprising:
   a movable frame rotatably supported on the shaft and having a camming surface thereon engaging the locking pawls in such a manner that counterclockwise rotation of the movable frame cams the locking pawls from released position to locking position;
   an activating pawl pivotally mounted on the movable frame;
   an activating ratchet wheel disposed on the shaft for selective engagement with the activating pawl;
   the activating pawl being pivotable relative to the movable frame between a first position in which it engages the activating ratchet wheel so that counterclockwise rotation of the activating ratchet wheel due to protraction of the belt effects counterclockwise rotation of the movable frame, and a second position wherein the activating ratchet wheel may rotate freely with respect to the movable frame;
   sensing means for shifting the activating pawl into engagement with the activating ratchet wheel in response to rapid deceleration of the vehicle; and
   a spring clutch for transmitting torque from the shaft to the activating ratchet wheel, the spring clutch being a coil spring disposed coaxially on the shaft in an interference fit and having one end fixed to the activating ratchet wheel so that the spring clutch provides a direct connection between the activating ratchet wheel and shaft unless counterclockwise rotation of the activating ratchet wheel is resisted by torque in excess of a predetermined maximum, in which case the spring clutch permits relative movement between the shaft and the activating ratchet wheel.

* * * * *